Aug. 13, 1946.  J. DAVIS  2,405,779
TOOL FOR INSTALLING NUT PLATES OR THE LIKE
Filed May 17, 1944
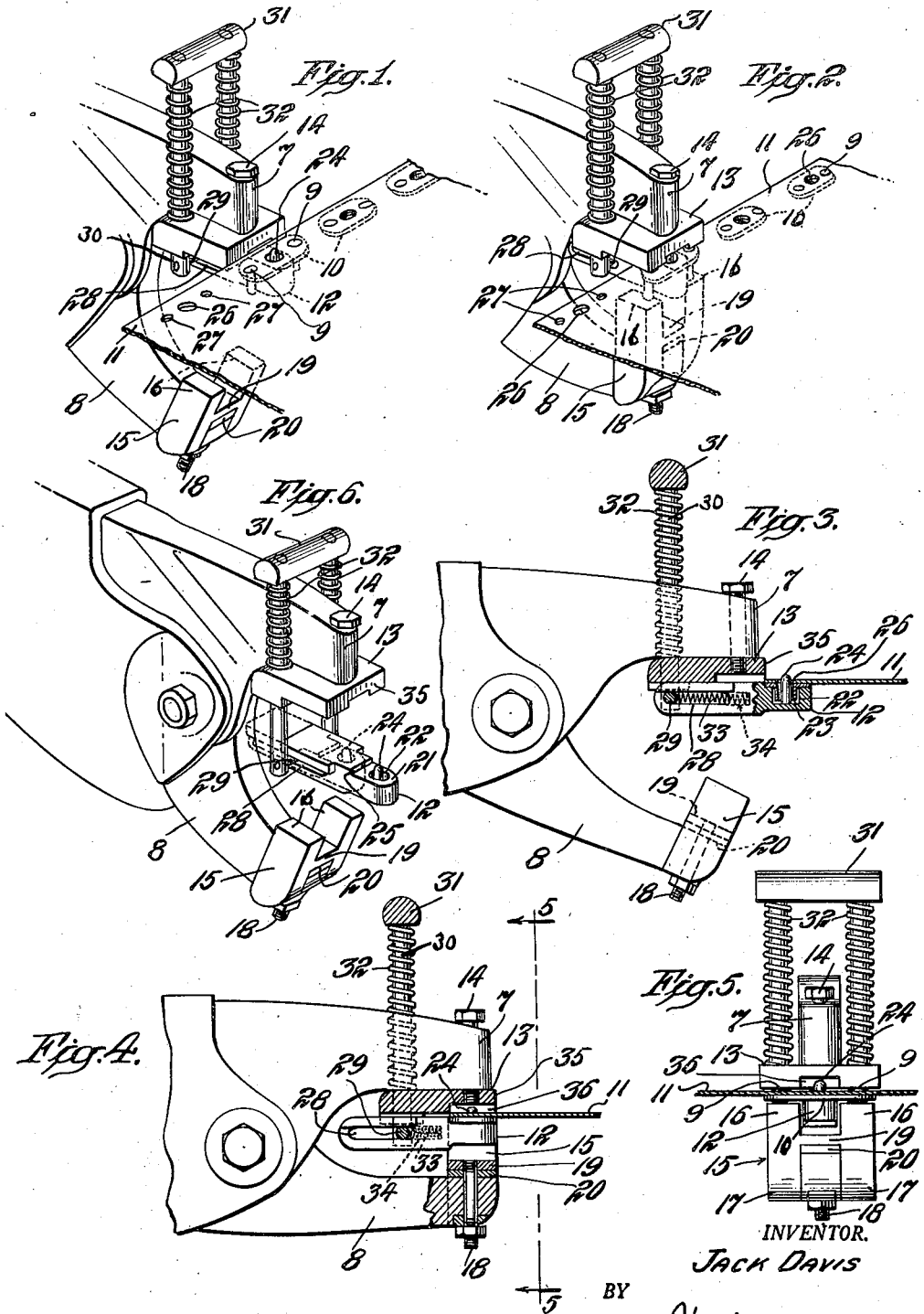
INVENTOR.
JACK DAVIS
BY
Philip S. McLean
ATTORNEY Patented Aug. 13, 1946

2,405,779

UNITED STATES PATENT OFFICE 2,405,779

TOOL FOR INSTALLING NUT PLATES OR THE LIKE

Jack Davis, El Dorado, Kans.

Application May 17, 1944, Serial No. 536,045

8 Claims. (Cl. 78—49)

The invention herein disclosed relates to the installation of nut plates or other more or less similar articles on aircraft or other structures.

Objects of the invention are to provide a tool by which nut plates or the like can be quickly and accurately positioned and secured on aircraft skin or other supporting structure.

Further objects are to provide a tool of the character outlined, which will be of relatively simple and inexpensive construction and entirely practical and efficient for the purposes intended.

Other desirable objects and the novel features by which all purposes of the invention are attained, will appear or are particularly set forth in the course of the following specification.

The drawing accompanying and forming part of the specification illustrates a present commercial embodiment of the invention, but it is to be understood, that structure may be modified and changed, all within the true intent and broad scope of the invention as hereinafter defined and claimed.

Fig. 1 in the drawing is a broken perspective view of the head portion of the tool, illustrating it in the step of positioning the nut plate beneath the skin or supporting layer and with the securing rivets dropped in place.

Fig. 2 is a similar view, illustrating the riveting jaws projected over and closing upon the rivets.

Figs. 3 and 4 are broken part sectional details of the parts as in the positions shown in Figs. 1 and 2, respectively.

Fig. 5 is an end view of the tool, as appearing from the section line 5—5 of Fig. 4.

Fig. 6 is a broken perspective view showing the jaws of the tool in open relation and the sliding tongue depressed, as for releasing it from the work.

In the main, the tool consists of companion upper and lower jaws 7, 8, for squeezing the rivets 9, which fasten the nut plates 10, to the skin or supporting structure 11, and a tongue 12, between the jaws for supporting and positioning the nut plate prior to its attachment to the skin.

The upper jaw is shown as carrying a plate 13, for backing up the rivet heads, said plate being shown as secured by a bolt 14, extended down through the jaw.

The lower jaw is shown as carrying a bifurcated H-shaped anvil piece 15, with the upper side portions 16, spaced to engage the stems of the rivets and the power side portions 17, spaced to bridge the lower jaw, all as indicated in Fig. 5.

This lower anvil piece is shown secured by a screw stud 18, projecting from the bridge portion 19, down through the jaw. Fig. 4 shows how a shim or shims 20, may be interposed beneath this bridge portion to adjust the rivet closing jaw elements for different lengths of rivets.

The tongue 12 is shown as having a shouldered seat or rest 21, for supporting and positioning the intermediate portion of the nut plate, with a recess 22, to receive the screw-threaded bushing 23, of the plate and an upstanding pin 24, at the center of such recess to project up through the bushing.

This construction enables the nut plate to be definitely located by placing it on the flat seat 21, with its edge against the shoulder 25, at the back of this seat and the screw flange 23, in the recess 22, with the pin 24, projecting up through the same. With the nut plate thus supported and retained in definite position, it is then easy to carry the plate in under the edge of the skin 11, and line the screw flange up with the screw opening 26, and the rivet holes with the rivet openings 27, Fig. 1, in the skin.

The tongue is slidably supported, so that it may project beyond the jaws as in Figs. 1 and 6, or retreat to line up between the jaws as in Figs. 2 and 4, in the present disclosure by cross slotting it at 28, to ride over a flat sided bar 29, supported across the lower ends of the rods 30, slidingly guided down through the upper jaw plate 13. The upper ends of rod 30, are shown connected by a cross bar 31, and springs 32, are shown interposed between this bar and the top of plate 13, to yieldingly support the tongue up against the underside of the upper jaw. A spring 33, seated in a bore 34, in the tongue and bearing against the forward side of the supporting bar 29, serves to thrust the tongue outward into the projecting position indicated in Figs. 1, 3 and 6.

The method of using the tool will be largely apparent from the foregoing. With the tongue thrust forward as in Figs. 1 and 3, the nut plate 10, is placed on the seat 21, the screw flange dropping into the well 22, centered over the positioning pin 24, and the outer edge of the plate held against turning against the shoulder 25. With the plate so held, the tool is lowered to carry the tongue beneath the edge of the skin or support 11, and then raised to bring the point of the positioning pin 24, up through the screw opening 26, in the skin. This positioning of the parts is usually assisted by the forward edge 35, of the top jaw plate coming into abutting engagement with the edge of the skin as indicated in Figs. 1 and 3. At such time, the rivet openings 27, in the skin will register with the corresponding openings in the nut plate and, with this registry of parts, the rivets 9, can be dropped into place in the aligning openings as in Fig. 1.

After thus locating the parts and temporarily interlocking the tongue with the work, through engagement of the socket 22, with the screw flange of the plate, and the holding of the plate to the skin by the inserted rivets, the jaw carrying portions of the tool are projected forwardly over the work to bring the opposed riveting elements over the ends of the rivets and the jaws are then closed to head the rivets as in Figs. 2, 4 and 5.

The upper jaw plate 13, is shown as grooved at 36, on the underside of the same, to accommodate the projecting tip of the positioning pin 24.

This pin may serve first as a "feeler" for helping to locate the nut plate over the supporting tongue and then as a feeler for bringing the supported plate up into proper position on the underside of the skin. The rivets as soon as they are dropped in place, then serve as the primary means for holding the nut plate in properly located position.

The jaws may be operated by power, like the jaws of a standard commercial "squeezer" and, in fact, the invention, including the upper jaw plate 13, and parts carried thereby and lower companion jaw member 15, may be made up as attachments, after the manner illustrated, to go on the jaws of a conventional form of squeezer.

After the rivets have been headed up as described, the tool may be freed from the work by opening the jaws and then pressing down on the handle bar 31, to lower the slide as in Fig. 6, to clear it from its engagement about the screw flange of the nut plate.

The upper and lower jaw members 13 and 15, are readily removable, enabling quick substitution of different sizes or forms of these parts and the height of the lower anvil member 15, as readily variable by the use of shims 20, to suit the length of the particular rivets being used.

As shown particularly in Fig. 5, the intermediate tongue 12, is narrow enough to pass freely between the spaced riveting heads 16, of the lower, bifurcated jaw member.

The tool consists of but few parts and these of simple, sturdy construction. It can be produced therefore at low cost and be continued in effective operation indefinitely.

The invention makes it possible and practical to install two or more rivets at a time. In some instances, the intermediate thrust tongue 12, may not be necessary and may then be removed, the tool then being used simply to squeeze two or more rivets, the number operated upon, depending upon the width of the upper and lower jaws.

What is claimed is:

1. A tool of the character disclosed, comprising companion fastener closing elements, a nut plate support disposed between said elements and having a socket to receive the screw flange of a nut plate and a positioning pin extending up through said socket to serve as a "feeler" for locating a supported nut plate in respect to the skin or other structure to which the nut plate is to be attached, means for projecting said support beyond said fastener closing elements, said projecting means being yieldable to enable retraction of a supported nut plate into position between said fastener closing elements and means for effecting motion of said support away from one of the closing elements to enable clearance of said "feeler" from the screw flange of an attached nut plate.

2. A tool of the character disclosed, comprising cooperative jaw members, one of bifurcated form, a support slidingly mounted on the other jaw member and narrow enough to freely operate within the bifurcated jaw member when said jaw members are closed, said support having a socket to receive the screw flange of a nut plate and a positioning pin to project through a screw flange centered in said socket.

3. A tool of the character disclosed, comprising upper and lower cooperating jaws, a riveting plate carried by the upper jaw, spring supported plungers operating down through said plate, a bar connecting said plungers beneath the plate, a support slidably engaged on said bar, spring means for normally projecting said support beyond the forward edge of the plate, means on the forward portion of said support for definitely positioning a nut plate or the like thereon and an anvil plate carried by the lower jaw having portions cooperative with the upper jaw plate at opposite sides of said slidably mounted support.

4. A tool of the character disclosed, comprising upper and lower cooperating jaws, a riveting plate carried by the upper jaw, spring supported plungers operating down through said plate, a bar connecting said plungers beneath the plate, a support slidably engaged on said bar, spring means for normally projecting said support beyond the forward edge of the plate, a socket in the forward portion of said slidable support for receiving the screw flange of a nut plate or the like, a positioning pin extending up through the center of said socket and an anvil member on the lower jaw having portions cooperative with the upper jaw plate at opposite sides of the slidably mounted support.

5. A tool of the character disclosed, comprising companion jaw members, a support mounted to project from and to recede between said jaw members, said support having a seat on the upper face of the same and a shoulder at the back of said seat for locating an article placed on the seat and said support further having a socket in said seat and a positioning pin projecting up through said socket.

6. A tool of the character disclosed, comprising companion jaw members, a support mounted to project from and to recede between said jaw members, said support having a seat on the upper face of the same and a shoulder at the back of said seat for locating an article placed on the seat, said support further having a socket in said seat and a positioning pin projecting up through said socket and yieldable means for normally projecting the support from between the jaw members.

7. A tool of the character disclosed, comprising companion jaw members, a support mounted to project from and to recede between said jaw members, said support having a seat on the upper face of the same and a shoulder at the back of said seat for locating an article placed on the seat, said support further having a socket in said seat and a positioning pin projecting up through said socket and means for effecting a separating movement of said support from one of said jaw members.

8. A tool for attaching nut plates to aircraft or the like, comprising companion riveting jaws, a nut plate support operating between said jaws and mounted to project beyond the jaws in one position to receive a nut plate and to recede between the jaws in another position to bring the supported nut plate into position for riveting, said support having a seat for the central portion of a nut plate and narrow enough to admit rivet fastenings through the nut plate at opposite sides of the intermediate supported portion of the same, said jaws having riveting portions cooperating at opposite sides of said nut plate support and recessed intermediate said riveting portions to permit relative projection and receding movements of said nut plate support in respect to said jaws.

JACK DAVIS.